United States Patent [19]

Embree

[11] 4,256,277
[45] Mar. 17, 1981

[54] ACTUATOR SYSTEM FOR AIRCRAFT CONTROL SURFACES

[76] Inventor: David G. Embree, 1916 Nebraska Rd., Rockford, Ill. 61108

[21] Appl. No.: 941,695

[22] Filed: Sep. 12, 1978

[51] Int. Cl.³ .............................................. B64C 13/28
[52] U.S. Cl. ................................ 244/213; 74/665 F; 244/76 R; 324/207; 340/27 R
[58] Field of Search ................ 244/76 R, 83 G, 83 H, 244/213, 60; 74/664, 665 F, 665 G; 64/2 R; 324/207, 208; 340/27 R, 671, 681

[56] References Cited

U.S. PATENT DOCUMENTS

| 3,317,829 | 5/1967 | Kuhrt et al. | 324/208 |
| 3,935,754 | 2/1976 | Comollo | 244/213 |
| 3,986,689 | 10/1976 | Maltby | 244/213 |
| 4,040,272 | 8/1977 | Boyd | 64/2 R |

*Primary Examiner*—Charles E. Frankfort
*Attorney, Agent, or Firm*—Wegner, Stellman, McCord, Wiles & Wood

[57] ABSTRACT

An actuator system for use in symmetrically positioning of control surfaces on opposite sides of an aircraft includes a primary load path for providing power to ball-screw mechanisms for moving the control surfaces between extended and retracted positions. A separate backup shaft is drivingly connected between opposite ends of the primary load path and, in normal service use, is unloaded. In the event of a failure in the primary load path, torque is transmitted through the backup shaft from the unaffected end of the primary load path so as to provide power for actuation of the ball-screw mechanism which otherwise would be affected by the failure in the primary load path. The backup shaft includes a one-piece continuous core whose axis is spaced laterally from the longitudinal axis of the primary load path to increase serviceability, reliability and reduce the likelihood of simultaneous damage to both the backup shaft and the primary load path. Additionally, sensors are provided at opposite ends of the backup shaft for detecting torsional deflection of the shaft as a result of torque being applied to the shaft when there is a failure in the primary system. When torsional deflection in excess of a predetermined amount is detected, a signal indicating such is provided and the signal is a reliable indication of failure in the primary load path inasmuch as substantial torsional deflection can occur only when the backup shaft is loaded as a result of failure in the primary load path.

6 Claims, 5 Drawing Figures

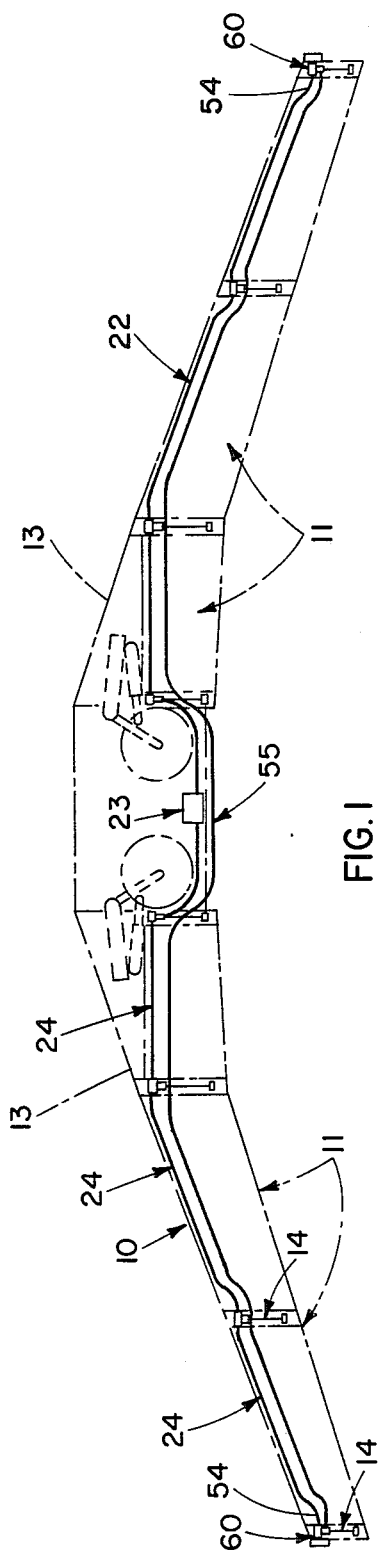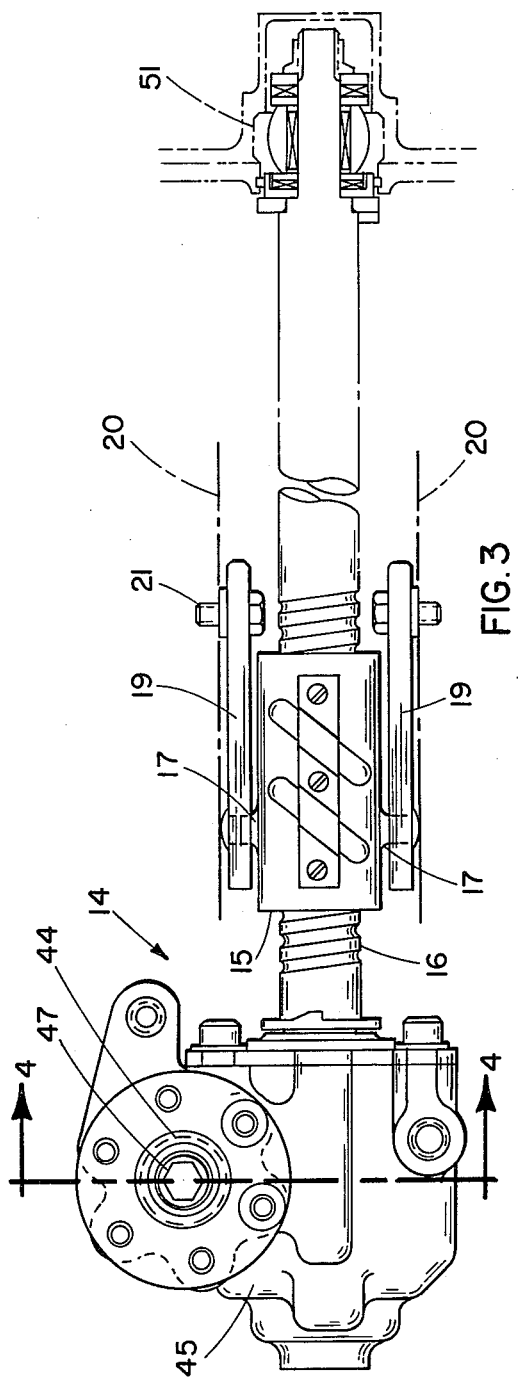

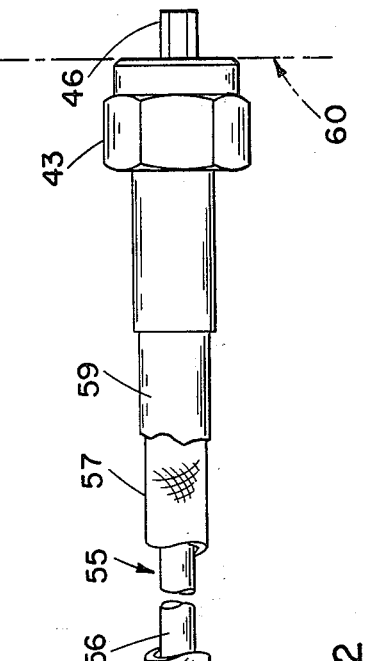
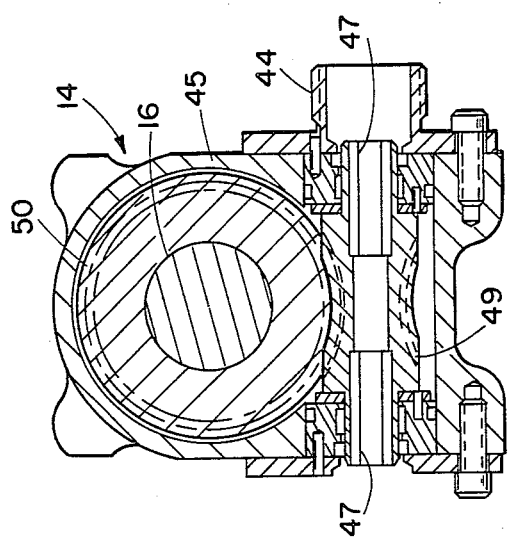
FIG. 4
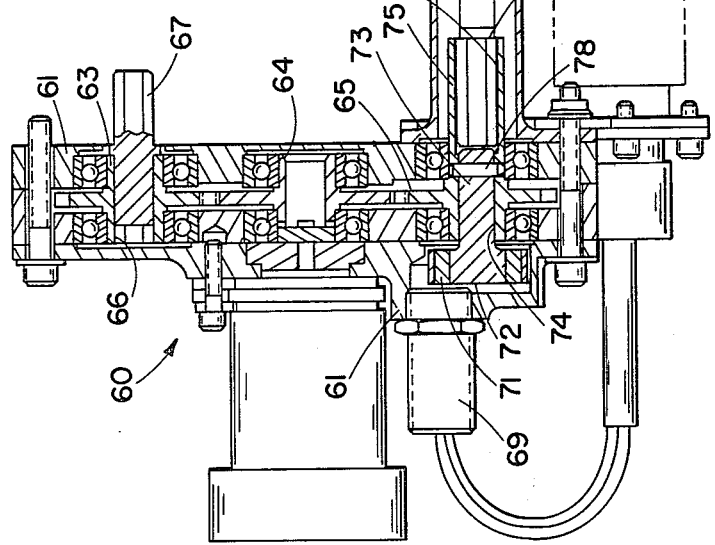
FIG. 2

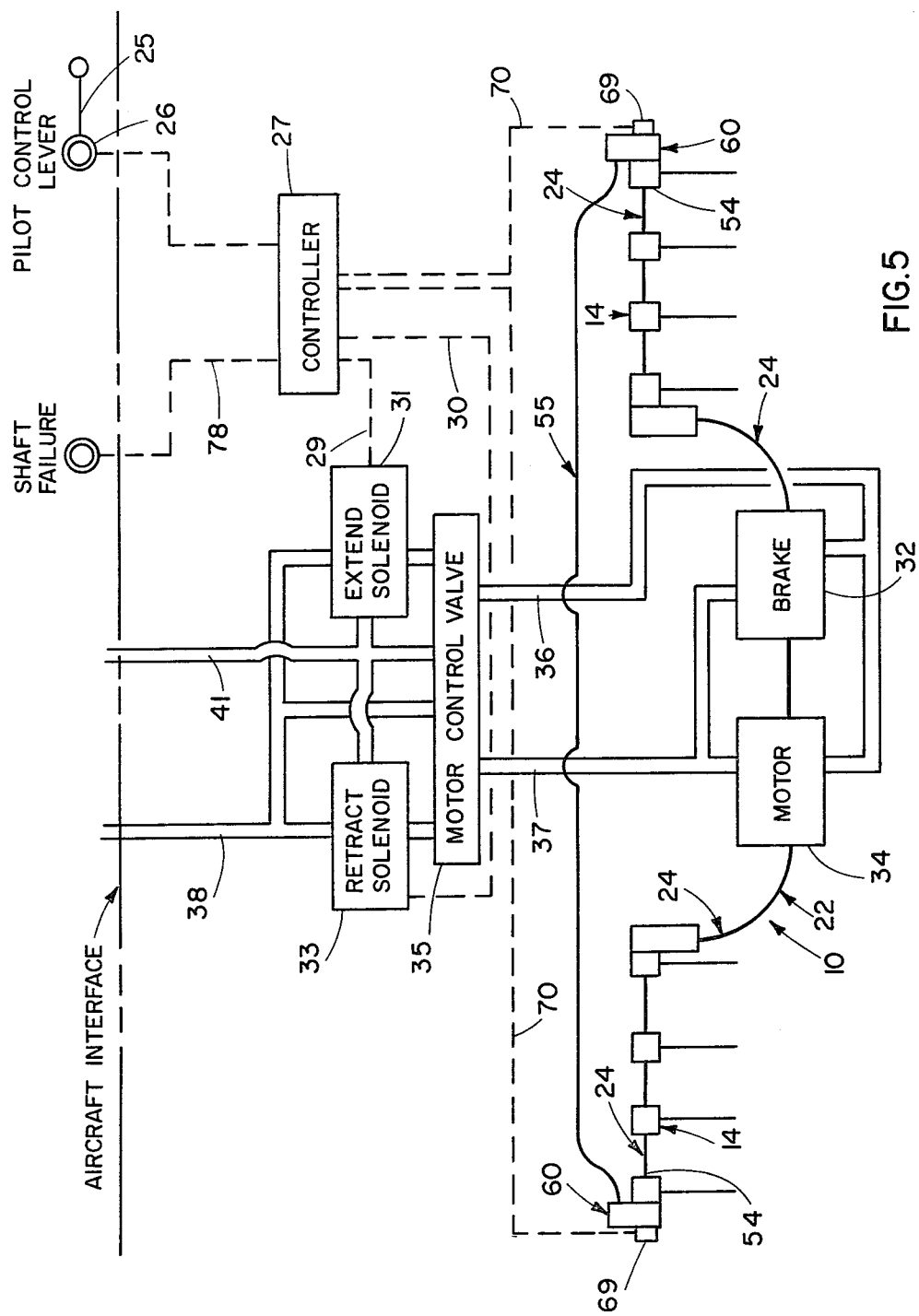

ACTUATOR SYSTEM FOR AIRCRAFT CONTROL SURFACES

TECHNICAL FIELD

The present invention relates generally to an actuator system such as may be used for positioning of control surfaces on an aircraft and particularly to an actuator system designed to prevent asymmetric deployment of the control surfaces in the event of a first failure of primary power transmitting components of the system.

BACKGROUND ART

For safe control in piloting an aircraft, it is necessary to maintain the control surfaces such as the flap panels and slats of the wings on opposite sides of the aircraft symmetrically. Asymmetric deployment of the control surfaces causes an imbalance in the lift forces applied to opposite sides of the aircraft, thereby tending to throw the aircraft into an uncontrollable state. Prior actuator systems have avoided this problem by sensing the relative positions of the control surfaces on opposite sides of the aircraft and braking against further movement of the control surfaces when the positions of the control surfaces start to become asymmetric as a result of a failure in normal operation of the actuator system.

In one prior system such as is disclosed in U.S. Pat. No. 3,986,689, a flap panel on each wing may be advanced or retracted relative to the wing through the use of one or more ball-screw mechanisms. A power drive unit in the aircraft connecting with each of the ball-screw mechanisms may be actuated under pilot control to either advance or retract the flaps to achieve either greater lift or drag as may be desired by the pilot of the aircraft.

Torque to actuate the ball-screw mechanisms normally is transmitted through a primary load path connecting between the power drive unit and the ball-screw mechanism. In the event that there is a failure in the primary load path, a backup load path connecting between outer ends of the primary path is available, as in Maltby Patent No. 3,986,689, to deliver power to the ball-screw mechanisms so that symmetrical positioning of the control surfaces of the aircraft may still be achieved. Connection to the opposite ends of the primary load path, enables torque to be transmitted through the backup shaft from either end. Accordingly, should there be a failure for example in a middle segment of the primary power path on one side of the aircraft, torque will be transmitted through the shaft of the backup load path from the opposite side of the aircraft to the point of failure thereby providing power to all of the remaining ball-screw mechanisms on the one side from the opposite direction.

DISCLOSURE OF THE INVENTION

The present invention contemplates construction of the actuator system with a backup shaft separate from the primary load path and with the shaft spaced laterally from the primary load path to enable easy service, replacement and visual inspection of the shaft for integrity. Moreover, by virtue of the foregoing construction, the system not only is simpler and less expensive to manufacture but is much less likely to be damaged by failure of the primary system or simultaneously with the primary system from anti-aircraft fire.

Another particularly unique aspect of the present invention resides in the use of torsional deflection of the backup shaft when under load to generate a signal warning the aircraft pilot of a failure in the primary load path. Advantageously, by using the backup shaft itself as a part of a load sensor operative to indicate a failure in the primary load path, a more reliable indication of failure in the primary load path is achieved because torsional deflection in the backup shaft can only occur with substantial loading of the backup shaft which, in turn, only occurs as a result of failure in the primary load path. To measure torsional deflection of the shaft, proximity detectors are utilized in comparing relative angular positions of the opposite ends of the backup shaft and providing a signal to the pilot to indicate failure in the primary load path.

The foregoing and other advantageous effects of the present invention will become more apparent from the following description when taken in conjunction with the accompanying drawings.

BRIEF DESCRIPTION OF THE DRAWINGS

FIG. 1 is a plan view of an actuator system embodying the novel features of the present invention with parts of aircraft wings and control surfaces of the aircraft being shown in phantom lines.

FIG. 2 is a cross-sectional view of a transfer apparatus connecting the primary load path with the backup load path including a sensor for detecting torsional deflection in the backup shaft.

FIG. 3 is a side view of a ball-screw actuator utilized in moving the control surfaces of the aircraft between extending and retracted positions.

FIG. 4 is a cross-sectional view taken substantially along line 4—4 of FIG. 3.

FIG. 5 is a control schematic of the actuator system of the present invention.

BEST MODE FOR CARRYING OUT THE INVENTION

As shown in the drawings for purposes of illustration, the present invention is embodied in an actuator system 10 for use in symmetrically positioning of control surfaces on opposite sides of an aircraft. Herein, the system is shown as mounted within the wings of the aircraft behind the rearmost spars 13 to move flap panels 11 between extended and retracted positions for varying the lift or drag of the wings. Within the wings, the flap panels 11 are guided by laterally extending tracks (not shown) and connected to opposite ends of the panels are ball-screw mechanisms or actuators 14 operable to slide the panels along the tracks for movement between extended and retracted positions. As shown in FIG. 1, four ball-screw mechanisms are provided in each wing for moving three flap panels. A representative ball-screw mechanism is shown in FIG. 3 and includes a ball nut 15 mounted on a usual screw shaft 16 for movement along the shaft as the latter is rotated. Protruding from opposite sides of the nut 15 are trunnions 17 journaled to parallel links 19 which may be connected to end plates 20 of adjacent flap panels 11 by suitable means such as the screws 21 so that the panels are carried with the ball nut as the latter traverses the screw shaft 16.

A power-drive unit 23 located between the aircraft wings is drivingly connected in series to each of the four ball-screw mechanisms 14 in each wing by flexible shaft segments 24 defining a primary load path 22 for delivering torque from the drive unit 23 to the mechanisms. The power-drive unit 23 may be controlled by the pilot of the aircraft to rotate the shaft segments 24 in either forward or reverse directions to extend or retract the flap panels 11 as desired. As shown schematically in FIG. 5, a pilot control lever 25 connects to a potentiometer 26 to provide a directional control signal to a controller 27 which is connected through lines 29 and 30 to solenoids 31 and 33. The power-drive unit 23 includes a hydraulically actuated motor 34 whose output connects directly with the shaft segments 24. A normally engaged brake 32 in the unit acts to hold the flap panels 11 against movement but actuation of the motor disengages the brake permitting movement of the panels. The solenoids 31 and 33 serve to shift a motor control valve 35 between extend and retract positions so that hydraulic fluid from a source (not shown) may be delivered from a supply line 38 through hydraulic lines 36 or 37 to control the direction of rotation of the motor output and, as a result, the direction of rotation of the shaft segments 24.

To assure symmetric deployment of the flap panels 11 on opposite sides of the aircraft in the event of failure in one of the shaft segments 24, a backup load path is defined by a shaft 55 extending between opposite outer ends 54 of the two outer primary load path segments 24. Both ends of the shaft 55 are driven in the same direction and at the same speed during normal operation of the system so that the shaft is unloaded, except for frictional losses, thereby giving it an essentially infinite load life in comparison to th components of the primary load path.

As shown in FIG. 2, the shaft 55 as well as the segments 24 are formed of a one-piece central core of wire cable 56 telescoped with a flexible protective mesh casing 57 which, in turn, is housed in a plastic sheath 59. The opposite ends of the shaft 55 and the shaft segments 24 include female fittings 43 and the latter are adapted to be threaded on male fittings 44 such as the one secured to the housing 45 of the ball-screw mechanisms 14 (see FIG. 4). The ends of the core protrude from the female fitting 43 and, herein, are shaped as hex splines 46 for telescoping with mating splines 47 of various components of the system. For example, in ball screw mechanisms 14, (see FIGS. 3 and 4) the splines 47 are formed in opposite ends of an enveloping worm gear 49 journaled with the housing 45. The worm gear meshes with a wheel gear 50 fixed to the screw shaft 16 so that as the worm gear 49 is rotated by the shaft segments 24, the wheel is turned in a direction perpendicular to the rotational axis of the shaft 24 to rotate the screw shaft 16 thereby causing the nut 15 to traverse the ball shaft. The outer end of the ball screw is rotatably supported within a journal 51 against movement transverse to the axis of the ball shaft.

In accordance with one important aspect of the present invention, construction and maintenance of the system is simplified and in-service reliability is enhanced substantially. For these purposes, the backup shaft 55 is formed as a single, continuous shaft connecting between the outer ends 54 but with the substantial length of the shaft being separate of and spaced laterally from the primary load path 22. Also, a particularly novel concept is utilized in detecting failure in the primary load path 22 wherein torsional deflection of the shaft is sensed for producing a signal, indicating failure. Advantageously, this method of failure detection provides a very reliable indication of failure in the primary load path because torsional deflection in the backup shaft 55 can occur only as a result of a substantial torque being transmitted through the shaft and such torque is transmitted only due to a failure in the primary load path. Thus, the shaft itself serves as a load sensor indicating failure of one of the segments 24 in the primary load path.

In the present instance, as shown in FIGS. 1 and 2, means in the form of two transfer apparatus 60 are provided in the system, one at each of the two outer ends 54 to connect opposite ends of the backup shaft 55 with opposite ends of the primary load path 10. Only one such transfer apparatus is shown completely in FIG. 2 and it includes a housing 61 containing a gear train of three gears 63, 64 and 65 which are suitably journaled within the housing 61. Herein, the upper gear 63 is provided with a splined central opening 66 which receives a spline stub shaft 67. The latter is utilized in connecting the outer end 54 of the primary power path to the transfer apparatus 60 through the outermost ball-screw mechanism 14. As shown by FIG. 4, the stub shaft 67 may be received within mating splines 47 of the enveloping worm gear 49 of the outer ball-screw mechanism 14.

For sensing torsional deflection in the backup shaft 55, means in the form of a magnetic proximity sensor 69 is mounted on the outside of the housing 61 adjacent the lower gear 65 and is electrically connected with the controller 27 through line 70 (see FIG. 5). Secured to the lower gear 65 are several (herein six, two being shown) magnetic inserts 71 which, when rotated past the proximity sensor, cause the sensor to produce a signal in the line 70. More particularly, the inserts are carried by a wheel 72 and integral shaft 73. The latter is telescoped through a central aperture 74 of the gear 65 to protrude from one side of the gear and is secured against rotation relative to the gear by means of a pin 78. Extending around the protruding end of the wheel shaft 73 is a hub sleeve 75 formed integrally with the gear 65. The central opening of the sleeve is hexagonally splined as 47 and telescopically receives the hex end portion 46 of the shaft 55 to provide a driving connection of the latter with the gear 65. Secured to the gear housing 61 around the hub sleeve 75 is an externally threaded collar 77 which extends inwardly beyond the sleeve 75 and includes the male fitting 44 which threadably receives the connector 43 of the shaft 55 to secure the casing and sheath of the shaft to the housing 61 of the transfer apparatus 60.

As the shaft 55 rotates during movement of the flap panels 11, controller 27 receives signals through the two lines 70 from each of the two proximity sensors 69 at opposite ends of the shaft 55. Under normal operating conditions, with little or no load being transmitted through the backup shaft 55, the signals from the two proximity sensors 69 remain fixed relative to each other. However, should one of the primary load path segments 24 fail so that torque is transmitted through the shaft 55, one end of the shaft will be advanced angularly relative to the other and this angular advancement or torsional deflection in the shaft will be reflected by a variation in the signal from one of the two proximity sensors 69. This variation is detected in the controller 27 to produce a signal in line 78 to indicate a failure in the primary load path.

From the foregoing, it will be appreciated that the present invention brings to the art a new and improved actuator system for positioning and maintaining substantial symmetry between first and second control surfaces such as the flap panels 11 on opposite sides of an aircraft both before and after a failure in the primary load path. Specifically, the exemplary system is constructed with the backup shaft 55 spaced separately from the longitudinal axis of the primary load path thereby greatly simplifying the system overall, rendering it easier to inspect and maintain and making it more reliable in service use. Moreover, the unique manner of detection of failure in one of the primary shaft segments 24 by measuring torsional deflection in the backup shaft 55 provides a more reliable indication of failure in the primary load path 22.

I claim:

1. An actuator system for positioning and maintaining substantial symmetry between first and second control surfaces on opposite sides of an aircraft, said system including, a power drive unit, a first actuator mechanism for connection to said first control surface for positioning said surface between extended and retracted positions, a second actuator mechanism for connection to said second control surface for positioning said second surface between extended and retracted positions symmetrical with the positions of said first control surface, a primary load path defined by first and second mechanical segments having opposite outer ends drivingly connected to said first and second actuator mechanisms, respectively, and inner ends connected to said power unit to be driven thereby to provide power to said first and second actuator mechanisms for symmetrically moving said first and second control surfaces, a backup load path including a shaft extending continuously from oneside of the aircraft to the other and drivingly connected between the outer ends of said first and second segments to transmit torque to said first actuator mechanism from said second segment in the event of failure in said first segment and to transmit torque from said first segment to said second actuator mechanism in the event of failure in said second segment, said shaft having a central axis spaced laterally from the longitudinal axis of said primary load path, and means for sensing torsional deflection in said shaft resulting from the transmission of torque thereby and for producing a signal in response thereto to provide an indication of failure in said primary load path.

2. An actuator system as defined by claim 1 wherein said shaft includes a substantially continuous, one piece flexible core, a protective casing telescoped over said core, and means at opposite ends of said core drivingly connecting with said first and second actuator mechanisms and said first and second segments, respectively.

3. An actuator system as defined by claim 1 wherein said means for sensing torsional deflection in said shaft comprises first and second sensors spaced from each other along said shaft, and actuating elements associated with each of said sensors and rotatable with said shaft, said elements being located in predetermined positions with respect to each other under normal operating conditions of said system but with torsional deflection of said shaft moving said elements angularly from said predetermined relative positions upon failure in one of said segments of said primary load path, each of said sensors producing a signal indicative of the position of said element.

4. An actuator system as defined by claim 3 including a controller operable to compare said signals from said sensors and to provide a warning signal indicating failure in said primary load path when a comparison of said sensor signals reveals torsional deflection in said shaft.

5. An actuator system as defined by claim 1 including first and second transfer apparatus connected between the outer ends of said first and second segments and said backup load path, each apparatus including a housing, a gear train journaled within said housing and drivingly connected between said outer end of one of segments and said shaft for rotation of said shaft in the same direction of rotation as the torque transmitted through said one segment, magnetic inserts carried by a gear in said train, and a magnetic proximity sensor attached to said transfer housing adjacent said gear.

6. A method of detecting failure in a primary load path of an actuator system for positioning control surfaces on opposite sides of an aircraft wherein substantial torque normally is not transmitted through a continuous backup shaft connected between opposite ends of the primary load path but is in the event of a failure in the primary load path, said method comprising the steps of detecting torsional deflection through said continuous backup shaft and providing a signal indicating failure in said primary path when such torsion deflection exceeds a predetermined magnitude.

* * * * *